April 24, 1945.  A. J. KORENYI  2,374,215
TESTING APPARATUS
Filed June 19, 1942
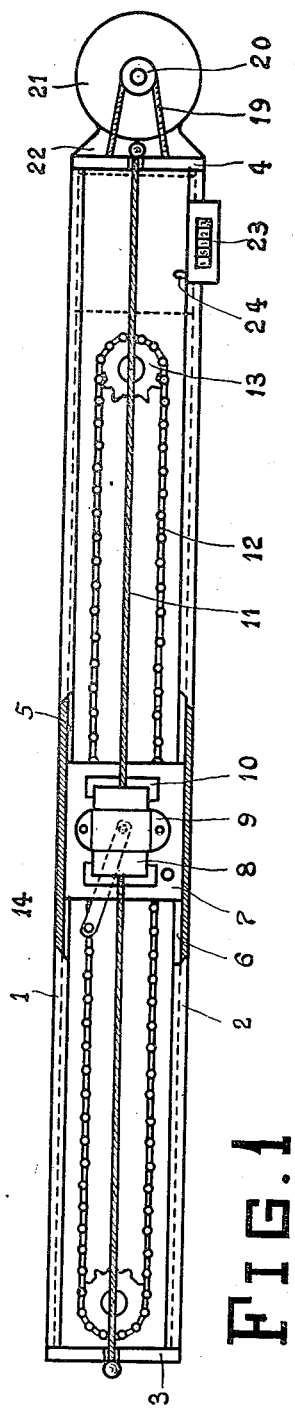
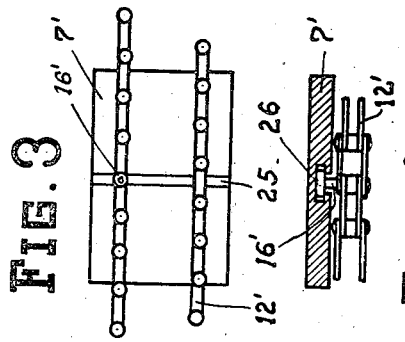
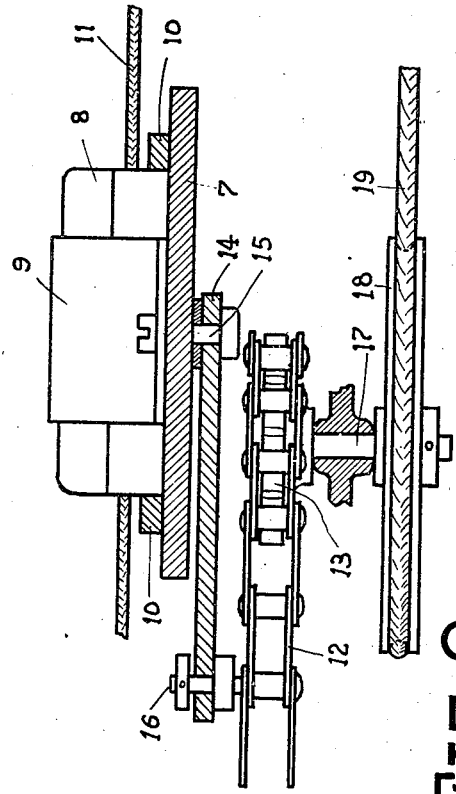
INVENTOR.
ANDREW J. KORENYI
BY Patented Apr. 24, 1945

2,374,215

UNITED STATES PATENT OFFICE 2,374,215

TESTING APPARATUS

Andrew J. Korenyi, New York, N. Y., assignor to Blade Master, Incorporated, New York, N. Y., a corporation of New York Application June 19, 1942, Serial No. 447,635

4 Claims. (Cl. 74—37)

My invention relates to improvements in apparatus for imparting to a machine element or device a periodical reciprocating motion over an elongated path, and especially to apparatus and machines in which this motion serves for testing purposes.

For instance, there are sharpening or honing devices for safety razor blades, which have a boxlike casing traversed by a cord and are operated by suspending the cord at one end, tautening it by holding the other end, and reciprocating the casing along the cord. When manufacturing such devices, it is of interest to test the quality of the product or to examine the suitability of individual parts or of the materials used therefor. A favorable way of making such tests is to imitate the motion and stress occurring in the intended use of the device, that is, to reciprocate the device along the appertaining cord while counting the number of reciprocations that can be applied without damage to the device or the individual parts thereof to be tested.

Another well-known type of blade-sharpening devices contains a leather strap which is reciprocated through a sharpening mechanism while engaging a blade placed into the mechanism. It will be understood that such a device, or its component parts, can also be tested by imitating the normal operating conditions continuously over a sufficient period of time.

There are a number of other cases in which a repeated reciprocation of a driven object is desirable. For instance, carpet sweepers and suction cleaners are usually operated by reciprocating strokes. Hence, they can be tested also by simulating the expected normal operating conditions. A similar reciprocating motion may be applied when testing carpets and rugs, or pieces thereof, as to the wear caused by sweepers or cleaners.

In cases of the foregoing type, the reciprocation extends over an elongated path of movement so that crank and cam mechanisms, usually employed for producing reciprocations, are not well suitable because they would have to be given a crank or cam diameter too large for constructing apparatus of practicable dimensions. It is also known to produce a reciprocating motion with the aid of an endless chain driven by means of two sprocket wheels and connected with the driven element by a pitman, the latter being at least as long as the path of travel in order to connect the chain with a cross head or slide disposed outside of the area of the chain mechanism. These known devices also require a considerable amount of space if employed for purposes where a rather long path of reciprocatory travel is necessary.

It is an object of my invention to provide apparatus for testing purposes and the like methods requiring reciprocations of an object over an elongated path of travel, while avoiding the above-mentioned drawbacks of the known mechanisms. More particularly, an object is to render the dimensions of the apparatus so small that its length does not appreciably exceed that of the required path of travel. An aim, in conjunction with the foregoing, is to provide apparatus especially favorable for use in testing laboratories or other places of limited space so that the apparatus can be placed alongside a wall and requires very little space transverse to the path of movement. A further object of my invention is to design an apparatus especially favorable for resting devices, or parts thereof, in which a strap or cord is used for imparting a sharpening motion to a razor blade, as is the case in the blade sharpeners above referred to.

According to the invention, an elongated frame structure forming a parallel-motion guide for a reciprocable slide is provided with an endless flexible member, in particular an endless chain, so that the latter is substantially co-extensive with the path of the slide motion. That is, the wheels or sprockets engaging and impelling the endless member are disposed near the ends, respectively, of the track formed by the frame structure. The slide is designed for accommodating or impelling the part to be reciprocated and is linked to the endless member by means of a coupling of extremely short length as compared with the path of the slide movement. In other words, the length of the path is many times greater than the effective length of the pitman or other element connecting the slide with the endless member.

According to another feature of my invention, a chain-and-sprocket mechanism, as described in the foregoing paragraph, is disposed fully within the confinements of the longitudinal side walls of the frame structure forming the guide or track for the slide, while the short end walls of the frame are provided with means for fastening thereto the cord or strand serving to cooperate with the part attached to the slide.

The foregoing and other features of my invention will be understood from the following description of the embodiments shown in the drawing, in which—

Fig. 1 shows a top view of an apparatus for testing sharpening devices for safety razor blades;

Fig. 2 is a part-sectional view on a larger scale of some parts of the apparatus of Fig. 1, the section extending at a right angle to the plane of illustration of Fig. 1;

Fig. 3 exemplifies a different way of coupling the slide with the endless driving chain of apparatus according to the invention, and shows a view of the slide and chain from below, while Fig. 4 is a side view of the same parts.

Referring to the apparatus shown in Figs. 1 and 2, 1 and 2 denote the longitudinal side walls of an elongated frame structure, and 3 and 4 the transversal end walls thereof. The longitudinal walls 1 and 2 are provided with guiding grooves 5 and 6 respectively. A slide 6 engages the grooves so that the latter form a parallel-motion track for the slide, permitting the latter to move over a path extending substantially from one to the other end of the elongated structure.

The frame and slide serve to accommodate a blade-sharpening device to be tested. The blade sharpener illustrated is of the type, known through U. S. Reissue Patent No. Re. 20,805 to Souczek, which contains a box-like casing and an operating cord extending through the casing and serving to actuate its interior sharpening means when the casing is reciprocated along the cord. The casing is denoted by 8. It is detachably mounted on the slide 7 with the aid of a fastening band 9, some stops 10 serving to secure the casing in its proper position. The cord, denoted by 11, is fastened to the end walls 3 and 4 of the frame structure by placing the buttoned ends of the cords into recesses of these walls. Any other fastening means are also applicable so long as they hold the cord in stretched and fairly taut condition.

Due to the above-described arrangement, the blade sharpener to be tested is actuated in a manner similar to its normal operation when the slide 7 reciprocates along the guidance formed by the frame walls 1 and 2.

An endless driving chain 12 is provided for actuating the slide. The chain is disposed between the side walls and end walls of the frame structure, and lies underneath the slide. Two sprocket wheels 12 and 13 engage the chain and are arranged near the ends of the path of travel of the slide 7. That is, the path of travel and the chain are substantially co-extensive and overlap each other over virtually the entire length of the slide motion. Accordingly, the connection between the slide and the chain is extremely short in the direction of travel. According to Figs. 1 and 2, this connection consists of a pitman member rotatably linked to the slide 7 by means of a bolt 15 (Fig. 2) and journalled to one of the joints of the chain by a bolt 16. The effective length of the pitman, i. e. the distance between bolts 15 and 16, is very small as compared with the path length of the slide motion. It suffices if the pitman is only slightly longer than the diameter of the sprocket wheels. In any event, the path of the slide motion is many times a multiple of this length.

The shaft 17 of the sprocket wheel 13 carries a driving disk 18 connected by means of a cord or belt 19 with the driven wheel 20 of an electric motor 21. The motor is mounted on a bracket 22 or the like support attached to the frame structure.

A counting device 23 has a movable stop 24 projecting into the path of the slide. By hitting upon the stop, the reciprocating slide causes the counter to register the number of reciprocations.

When in operation, the rotating chain 12 entrains the pitman 14 which in turn imparts a reciprocating motion to the slide and the object mounted thereon with the effect that the blade-sharpening device is continuously actuated in accordance with its normal way of operation. The number of reciprocations is registered by the counter 23. If the specimen tested withstands a standard number of movements without being damaged, it satisfies the test; or, if a specimen is reciprocated until one or several component parts are damaged or unduly worn down, the number of test cycles preceding the damage is a measure of the strength or wearing qualities of the component parts or the material of which they are made.

It will be seen from the illustrated apparatus that the width of the apparatus is extremely small and that its length does not appreciably exceed the absolutely necessary length of the path of travel. By arranging the drive motor within the confinements of the frame structure, a further reduction in length can be obtained.

Figs. 3 and 4 represent a modification of the driving connection between the chain and the slide member. According to these figures, the slide 7' has a transversal slot 25 of T-shaped cross section. At bolt 16' of the chain 12 carrying a nut or bead 26 engages the slot so as to be slidable relative thereto. When using a linkage of this type, a pitman can be dispensed with and the length of the apparatus reduced to a further extent.

In the above-described construction, the driving chain is of the type used, for example, in bicycles or power transmissions. It is, however, also possible to use instead flexible transmission members, such as a steel-rope or belt drive.

While I have illustrated the use of an apparatus according to the invention for testing a special type of blade-sharpening device, it will be apparent that the same or substantially the same apparatus can also be used for other purposes requiring similar operating conditions. For instance, when testing blade sharpeners having a leather strap for honing a blade, the strap is attached to the end walls 3 and 4 in a way similar to the cord arrangement illustrated.

For testing carpet sweepers and suction cleaners or parts thereof, a correspondingly larger construction of the apparatus is necessary. As a matter of fact, the larger the apparatus and the longer the path of reciprocating motion, the more appreciable are the above-mentioned advantages of the invention. When testing sweepers and cleaners, a bridge piece, carrying the carpet or other surface element to engage the test object, is placed across the end walls 3 and 4, and the test object is attached to the slide. A similar arrangement is employed for testing the wearing qualities of carpets or other floor covers. The testing of brushes, safety razors, frictional linings, abrasive or honing surfaces and the like, may be effected in substantially the same manner. Instead of for testing, an apparatus according to the invention can also be used for operating a reciprocatory device, for instance for sharpening blades. Such apparatus may also be employed if the reciprocating slide member is not immediately used for carrying and impelling an object but is connected with some other machine part to be actuated by long-stroke reciprocations and, in general, for purposes of energy transmission involving the transformation of a revolving motion into a reciprocation of greater length than conveniently obtainable by cranks or eccentrics.

I claim:

1. A testing apparatus for imparting a periodical and reciprocatory motion to a test object relative to a strand element cooperatively engaging the test object, comprising a guiding frame of elongated shape, a slide member movably engaging said frame so as to be capable of guided motion over a rectilinear path extending in the longitudinal direction of said frame, fastening means disposed on said slide for removably attaching thereto the object to be tested, said frame having fastening means disposed at both longitudinal ends of the frame for removably attaching the strand element so as to hold it in taut condition, a transmission mechanism having an endless chain arranged so as to be substantially co-extensive and in parallel to said path of said slide member, a pair of sprockets engaging said chain and arranged near the ends of said path, respectively, connecting means disposed between said chain and said slide member to reciprocate the latter when said sprockets perform a unidirectional rotation, and motoric means for driving one of said sprockets.

2. A testing apparatus for imparting a periodical and reciprocatory motion to an object relative to a strand element cooperatively engaging said object, comprising an elongated frame structure forming a guiding path, a slide movably engaging said guiding structure so as to be capable of reciprocating motion along said path, transmission means having an endless flexible member and a pair of wheels engaging said member, coupling means connecting said slide with a point of said member for imparting reciprocating motion to said slide when said wheels perform unidirectional rotation, drive means for actuating at least one of said wheels, fastening means disposed on said slide for exchangeably accommodating the object to be reciprocated, and said frame structure being provided at both longitudinal ends with fastening means for holding said strand element taut along said path of motion.

3. An apparatus for reciprocating a structure relative to an elongated strand element cooperatively engaging said structure, comprising, in combination, a frame of elongated shape having at both longitudinal ends means for holding said strand element so that said element extends in the longitudinal direction of said frame, said frame being provided with guiding means, a slide movably engaging said guiding means so as to be capable of guided parallel motion over a path extending in said longitudinal direction, fastening means disposed on said slide for accommodating said structure to be reciprocated along said strand element, an endless transmission chain arranged so as to be substantially co-extensive and in parallel to said path, two sprocket wheels engaging said chain and disposed near the ends of said path respectively, a pitman member linked to said chain and said slide respectively, said path having a length of a multiple of the effective length of said pitman member, and an electric motor attached to said frame and connected with one of said sprocket wheels for actuating said chain.

4. An apparatus for testing blade sharpeners, or parts thereof, having a box-like device and an actuating cord extending through said device for operating the latter by reciprocating the device relative to said cord, which comprises a frame structure of elongated shape having longitudinal side walls provided with guiding means and lateral end walls designed for removably attaching thereto the ends respectively of said actuating cord, a slide member movably engaging said guiding means so as to be capable of guided parallel motion over a path extending in the longitudinal direction of said structure, means disposed on said slide member for fastening thereto said box-like device to be reciprocated along said cord, an endless transmission chain arranged between said side walls underneath said slide and extending substantially in parallel over substantially the entire extent of said path, two sprocket wheels engaging said chain and arranged between said walls near the ends respectively of said path, a connecting member linking a point of said chain to said slide member, respectively, for imparting reciprocatory motion to said slide when said wheels perform a unidirectional rotation, the length of said path being a multiple of the length of said connecting member and a motor mounted on said frame structure for causing said wheels to actuate said chain.

ANDREW J. KORENYI.